Jan. 10, 1933.  E. G. STAUDE  1,894,131
PAPER BOX MACHINE
Original Filed March 11, 1929  9 Sheets-Sheet 3

INVENTOR
EDWIN G. STAUDE
BY
ATTORNEYS

Jan. 10, 1933.  E. G. STAUDE  1,894,131
PAPER BOX MACHINE
Original Filed March 11, 1929  9 Sheets-Sheet 4
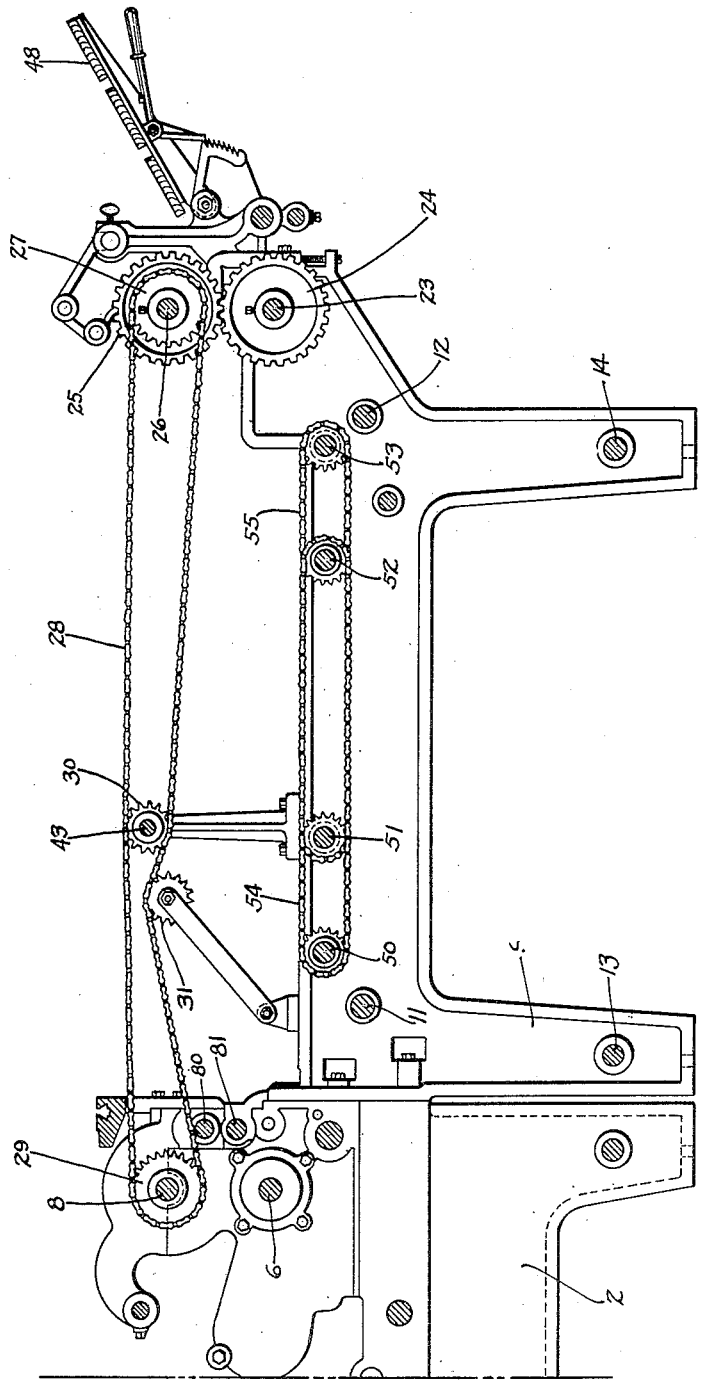
INVENTOR
EDWIN G. STAUDE
BY Paul Paul H Moore
ATTORNEYS

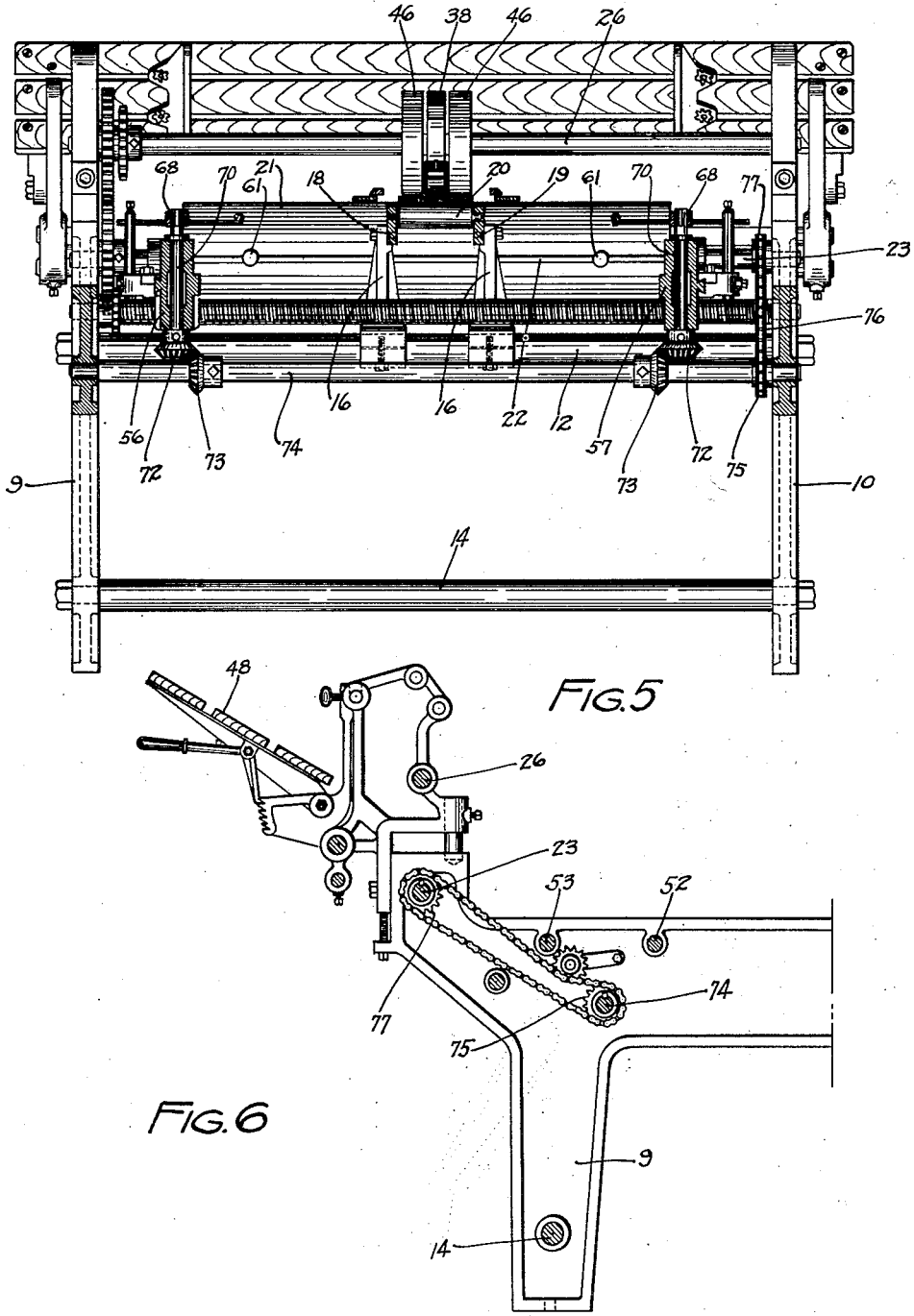

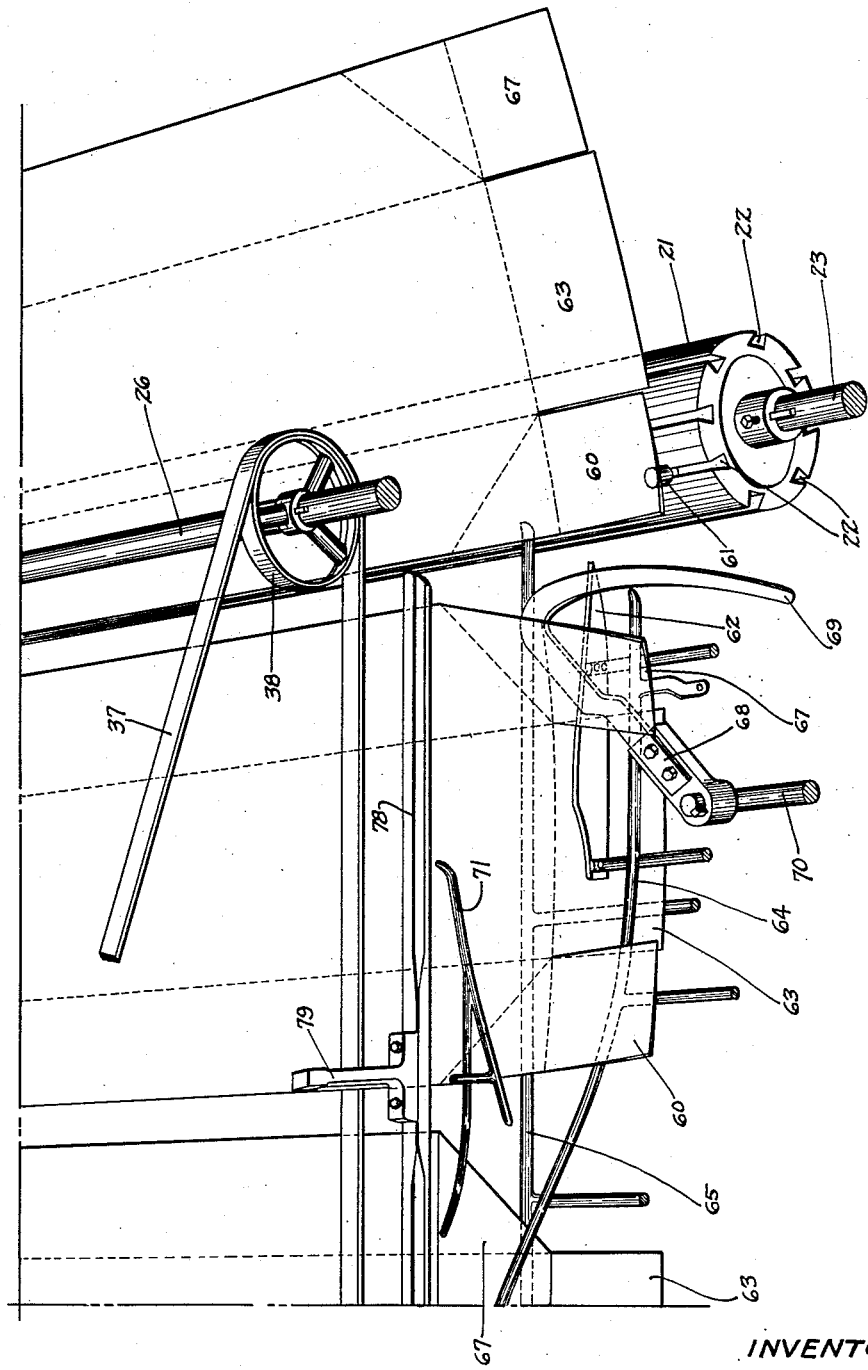

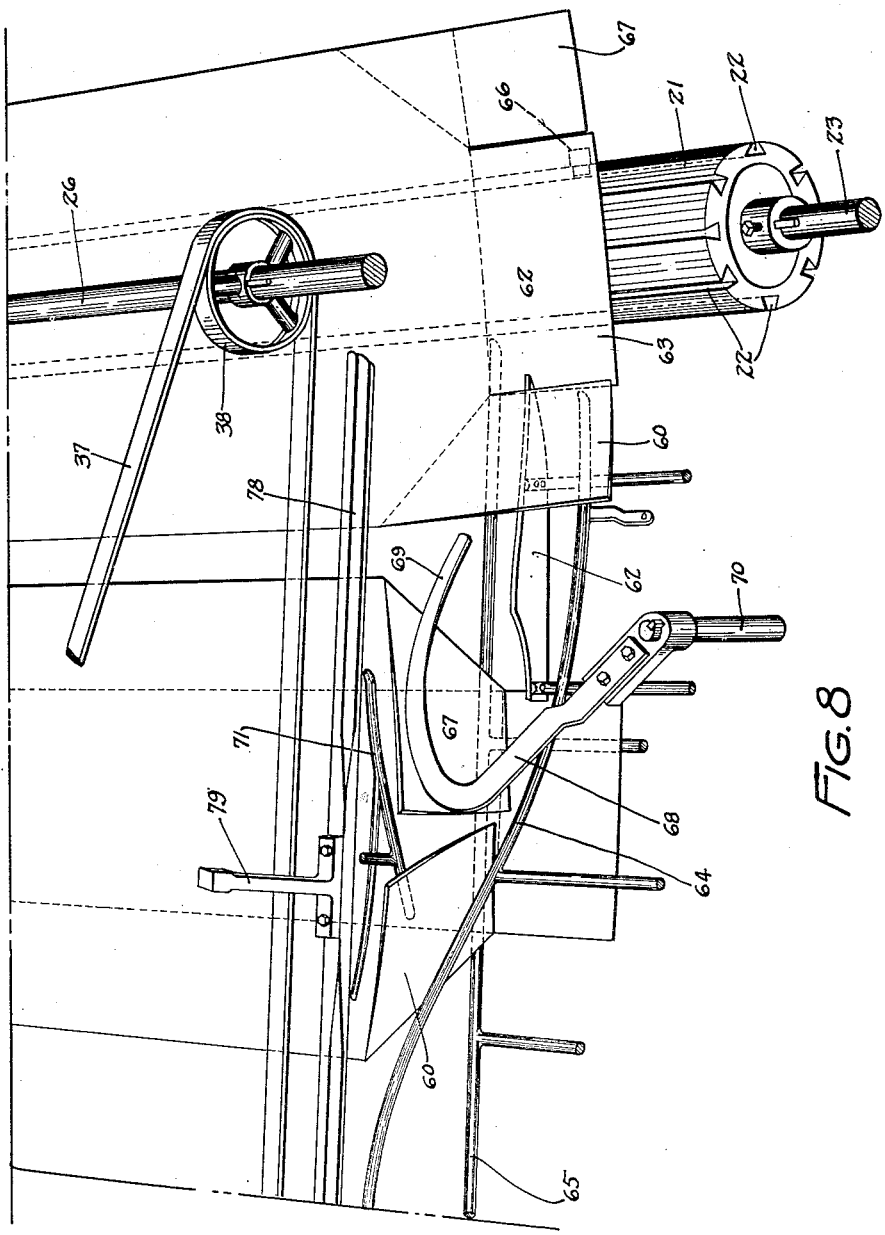

Jan. 10, 1933.  E. G. STAUDE  1,894,131
PAPER BOX MACHINE
Original Filed March 11, 1929   9 Sheets-Sheet 9

INVENTOR
EDWIN G. STAUDE
ATTORNEYS

Patented Jan. 10, 1933

1,894,131

UNITED STATES PATENT OFFICE

EDWIN G. STAUDE, OF MINNEAPOLIS, MINNESOTA

PAPER BOX MACHINE

Application filed March 11, 1929, Serial No. 346,129. Renewed November 17, 1932.

This invention relates to improvements in folding and gluing machines of the type shown in my prior Patent Number 1,104,013 of July 21, 1914. The present invention relates to mechanism for automatically folding, gluing and again folding carton blanks for collapsible boxes or paper goods. The primary object of this invention is to provide a machine for folding and gluing collapsible or knock-down so-called "diagonal fold" boxes or containers, of the general type herein described, at high speed. Other objects are to provide mechanisms, parts of which can be readily adjusted and adapted for different sizes of blanks; to provide a machine which can accomplish the primary folding before the gluing operation, and which can properly handle blanks having a plurality of flaps, such, for example, as those having center and end flaps, whatever the length of the center flap; to provide means for selectively raising the end flaps; to provide means for supporting the flaps and holding them in raised position after the action of the last mentioned means; to provide a synchronized rear flap folding element constructed and adapted to engage the rear flap and fold it over and downwardly against the top surface of the carton during travel of the carton; to time this rear flap folding element so that the flap engaging portion will travel at a greater speed than the travel of the carton; to provide selective flap-lifting and rear flap-folding mechanisms simultaneously operable at opposite sides of the carton as it is fed; to provide mechanism for operating the parts adjustable transversely of the machine conformably to carton blanks of different transverse dimensions; to provide adjustable selective flap-lifting means by which the operation can be performed for cartons having front and rear flaps differently spaced; to arrange this selective flap-lifting mechanism so that it will not operate upon the center flap or flaps; to provide a supporting bar over which all the flaps pass to prevent the blank from sagging when large blanks are being folded; to provide a folder bar under which all the flaps pass; to arrange the rear flap-folding element or element and to time it or them so as to pass over the separator bar and under the flap and turn the flap and hold the flap in downwardly turned position; to provide a guide rod which receives the flaps and holds them in folded-over position until they pass under the end of the stationary folder bar; to provide former bars adjustable to prevent rising of the blank and flaps; to provide feed rollers which serve to roll down the folded flaps and to advance the blank to an adjustable glue wheel; to provide a former bar and a stationary plow share folder bar to bring the center flap against the end flaps after gluing, to complete the folding operation; and to provide simple and efficient constructions for speedily and accurately accomplishing all the above mentioned objects. The intention herein is to claim all details of construction of the apparatus as shown, as well as to claim the combinations and sub-combinations of the parts both broadly and specifically.

The invention therefore consists generally in the various constructions and combinations hereinafter described and particularly pointed out in the claims.

Objects, features and advantages will appear from the description of the drawings forming a part of this application, and in said drawings Figure 1 is a plan view of the machine embodying my invention:

Figure 4 is a longitudinal section on the line 4—4 of Figure 1;

Figure 5 is a cross section on the line 5—5 of Figure 1;

Figure 6 is a partial section on the line 6—6 of Figure 1;

Figure 7 is a perspective detail of the first operation of the left-hand feeding and folding mechanism;

Figure 8 is a perspective detail of the second step of the left-hand folding operation;

Figure 1:
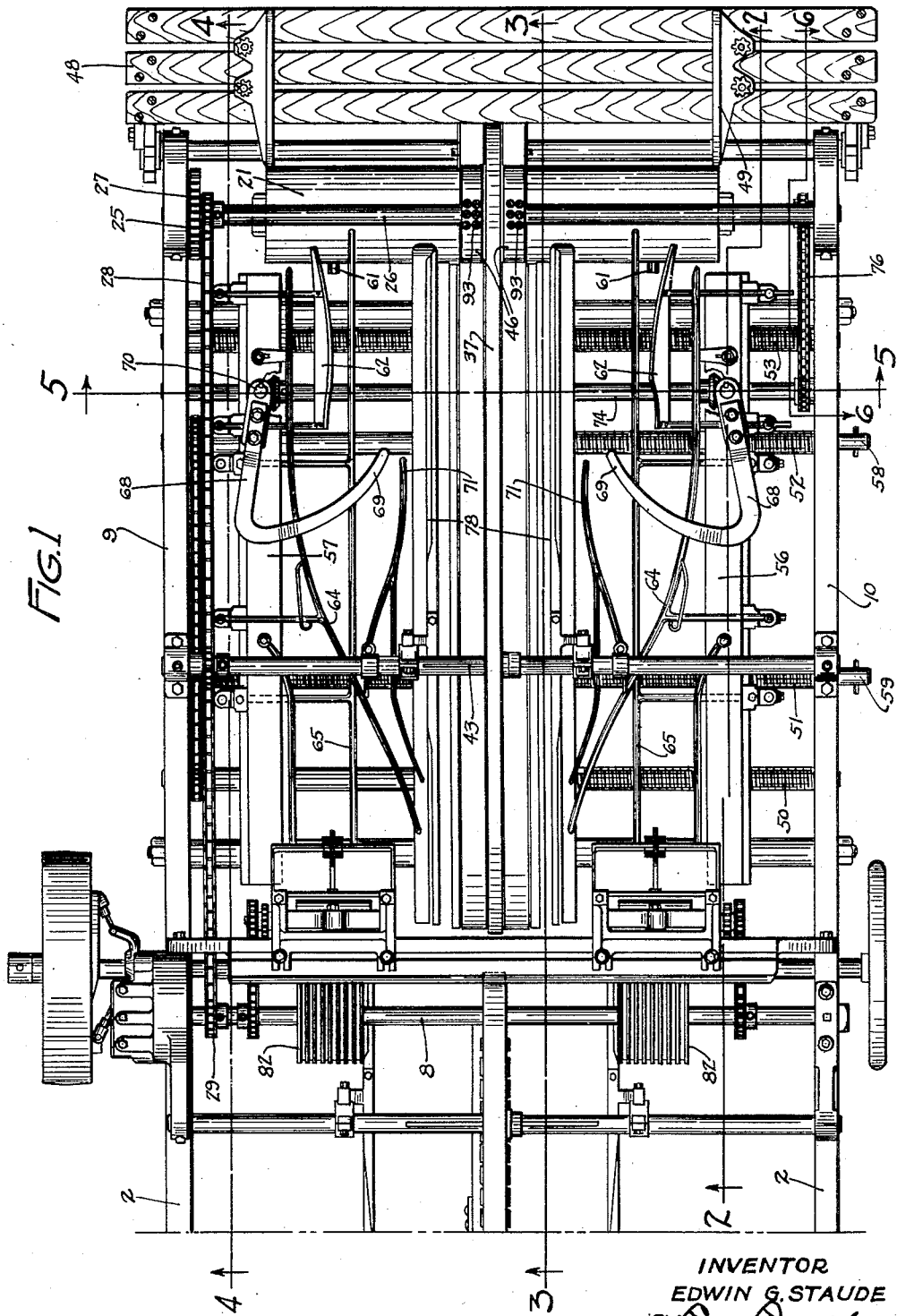

As shown in the drawings, 2 represents the base or frame of a standard type of folding box gluing machine having the usual bottom carrier belt 3 and top carrier belt 4 arranged to advance the blank through the machine. The bottom carrier belt 3 is mounted on pulleys 5 keyed to shafts 6, and the belt 4 is operated by pulleys 7 keyed to shafts 8.

Secured to the frame structure 2, I provide auxiliary frames 9 and 10. The frames 9 and 10 support the principal mechanism embodying my invention and are provided with stationary cross bars 11, 12, 13 and 14. These cross bars serve to act as spreaders between the two frames 9 and 10, and when securely bolted in place form a rigid construction.

Mounted on the cross bars 11 and 12 are uprights 15 and 16 which support the center lower carrier mechanism 17. This mechanism comprises a pair of bars 18 and 19 between which rollers 20 are mounted (see Figure 5). At the forward end of the frames 9 and 10, I provide a drum 21 having a series of V-shaped grooves 22. The drum 21 is mounted on a shaft 23 and is driven by a spur gear 24 keyed to the shaft 23 (see Figure 4) and the spur gear 24 meshing into a spur gear 25 on the feed wheel shaft 26. The sprocket 27 is secured to the feed wheel shaft 26 and is driven by a sprocket chain 28, which in turn is driven by a sprocket 29, secured to the upper carrier belt shaft 8. The idler sprockets 30 and 31 serve merely as chain tighteners for the sprocket chain 28.

At a point near the center of the drum 21 (see Figure 3), I provide a belt 32 adapted to travel over the tops of the rollers 20 in the center carrying mechanism 17 and over an idler 33 and around tightener pulleys 34, 35, and 36. Co-acting with the belt 32 is a top carrier belt 37 (see Figure 3) driven by a pulley 38, secured to the feeder shaft 26.

The belt 37 is held in contact under tension against the belt 32 by a top carrier mechanism 39, adjustably held in place by an arm 40 having adjustable connections with the top carrier mechanism at 41 and 42. The arm 40 is held in position by a shaft 43 mounted on brackets 44, secured to the side frames 9 and 10.

A suitable belt tightener 45 is provided to take up the slack in the belt 37. Suitable feed wheels 46 (see Figure 5) are provided on the feed wheel shaft 26, which cooperate with a retard feeding mechanism 47 (see Figure 3). An adjustable feed table 48 is provided with side guides 49 placed in the manner so that as the number of cut and creased blanks are placed on the feed table, the feed wheels 46 are adjusted to feed off the top blanks one at a time and advance them between the belts 32 and 37.

Figure 2:
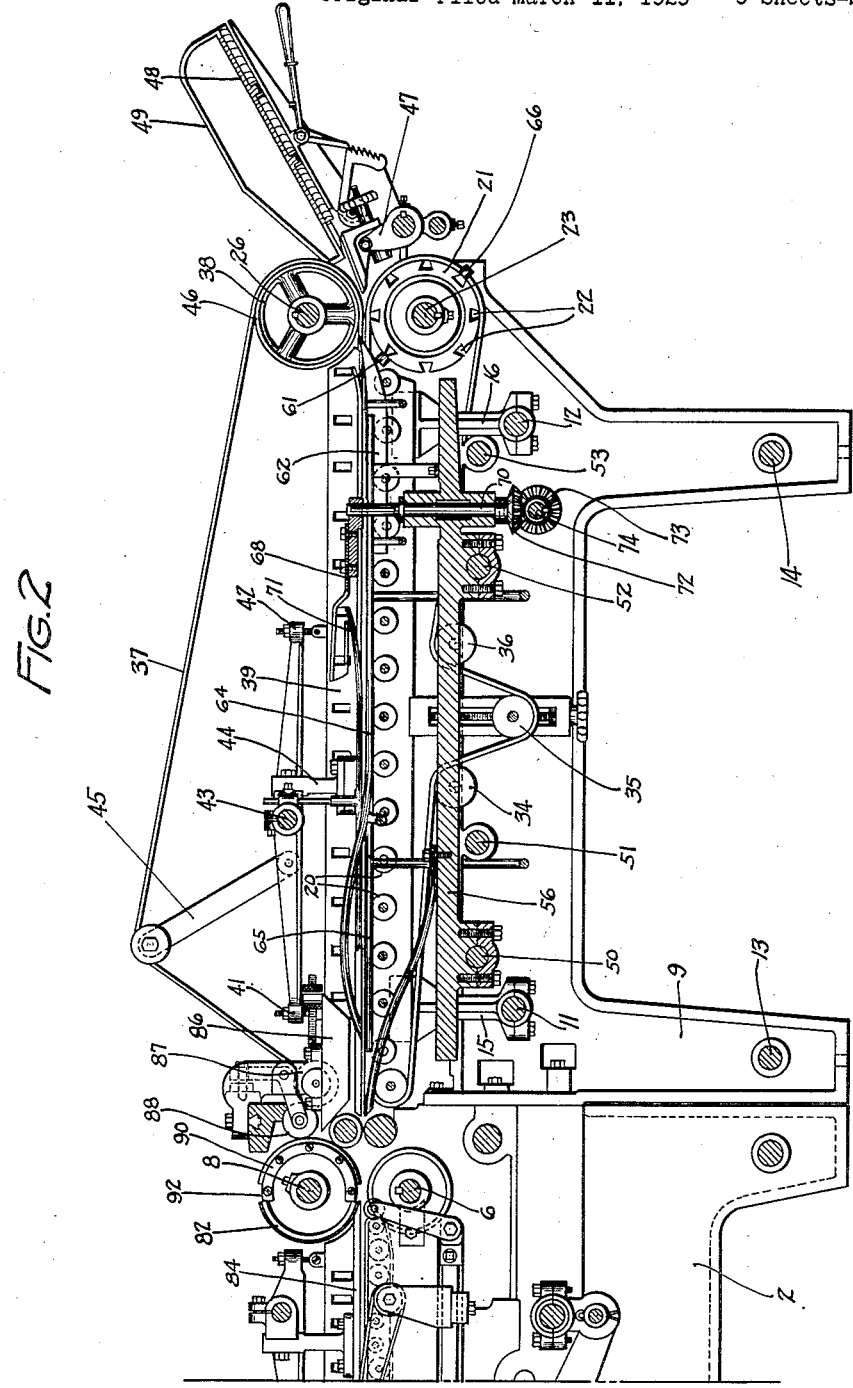
Figure 2 is a longitudinal section on the line 2—2 of Figure 1.
Figure 3:
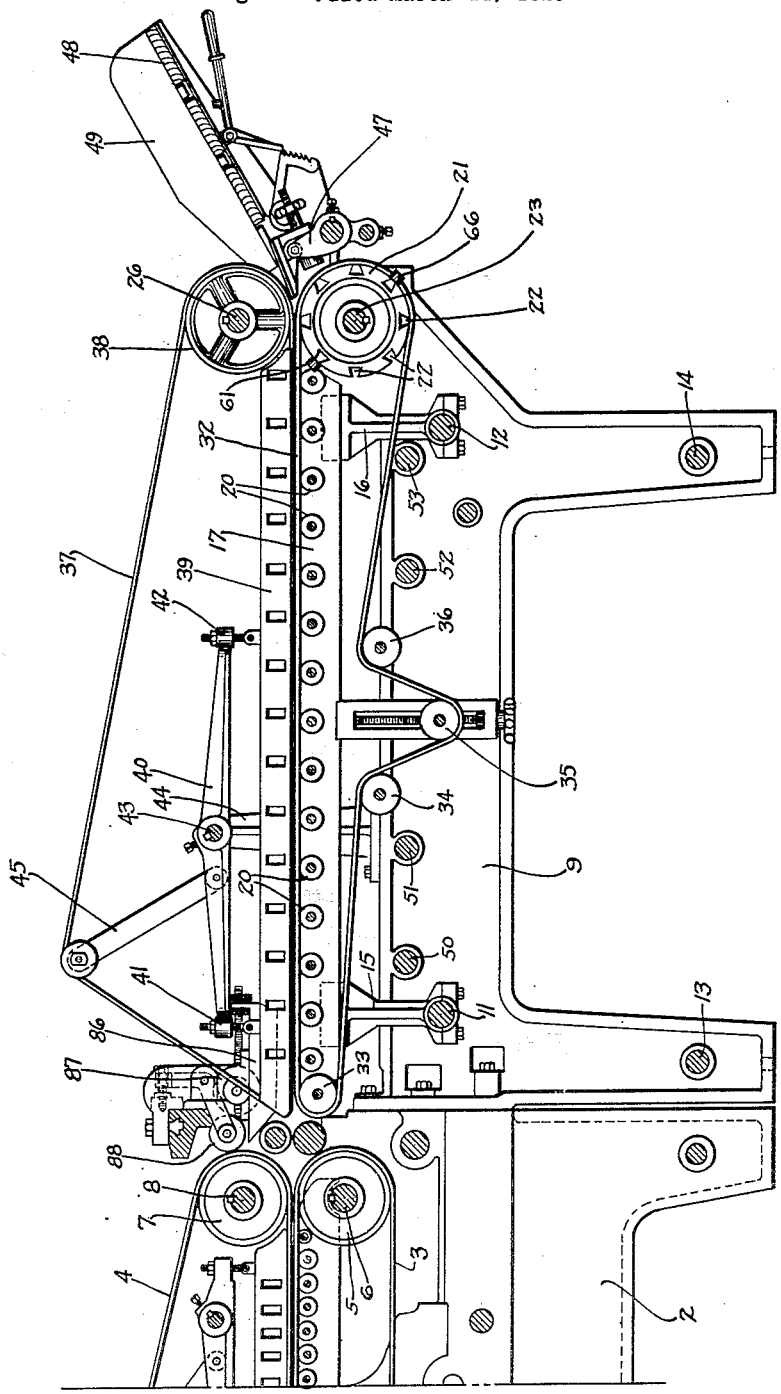
Figure 3 is a longitudinal section on the line 3—3 of Figure 1.

The frames 9 and 10 are also provided with adjustable screw shafts 50, 51, 52 and 53 (see Figures 2, 3 and 4). The screw shafts 50 and 52 (see Figure 4) are connected by a sprocket chain 54, and the screw shafts 51 and 53 are connected by a sprocket chain 55. Mounted on the screw shafts 50 and 52 (see Figure 2) is an adjustable frame 56, and mounted on the screw shafts 51 and 53 is an adjustable frame 57. By placing a crank on the extension 58 of the screw shaft 52, the frame 56 can be adjusted towards or from the center of the carrying mechanism of the machine. By placing a crank on the extension 59 of the screw shaft 51, the frame 57 can be adjusted towards or from the center of the carrying mechanism of the machine.

The frames 56 and 57 are adapted to support the folding mechanism, which must be adjusted towards or from the center of the machine for adapting the machine to run different sizes of blanks that are required to be folded and glued.

As the blanks are fed out of the feed hopper one by one between the feed wheels 46 and the drum 21 (see Figures 5 and 7), the forward flap 60 of the blank comes in contact with a pin 61 radially adjustably mounted in the V-shaped groove 22. This pin 61 lifts the forward flap at an angle over the top of the separator bar 62. As the blank advances into the machine, the center flap 63 traveling straight ahead will pass under the separator bar 62 and under the stationary folder bar 64. All of the flaps, however, pass over the supporting bar 65, which is merely to prevent the blank from sagging when large blanks are being folded. A similar pin 66 (see Figure 8) is mounted radially in one of the other adjustable slots 22 and timed to raise the rear flap 67 above the separator bar 62.

From the construction just described it is clear that the flaps 60 and 67 pass above the separator bar 62 and ride up on the incline stationary folder bar 64 (see Figure 8). It follows, however, that the flap 67 must be folded over in the direction of the line of travel, and since it cannot do this by riding up the incline of the stationary folder bar 64, as in the case of the front flap 60, it is necessary to provide an additional mechanism for this purpose. In order to accomplish this, I provide a revolving folder 68 having a circular projection 69 and mounted on a shaft 70. The radius of this revolving folder 68 is considerably larger than the radius of the drum 21, so that the surface speed will therefore be considerably greater and therefore travel more rapidly than the speed of the blank.

By referring to Figure 8, it can be seen that as the revolving folder turns on the shaft 70, and timed correctly, the revolving folder will pass over the separator bar 62, but under the flap 67, and turn it over, the extension 69 serving to hold the flap down until it has traveled far enough to get under the guide rod 71, which holds it in its down position until both flaps 60 and 67 pass under the end of the stationary folder bar 64. The shaft 70 of the revolving folder 68 is mounted in the adjustable frames 56 and 57, and driven by bevel gears 72 and 73. Bevel gears 73 are secured to a shaft 74 which is driven from the shaft 23 by a sprocket 75, a sprocket chain 76 running over a sprocket 77 on the shaft 23.

Figure 9:
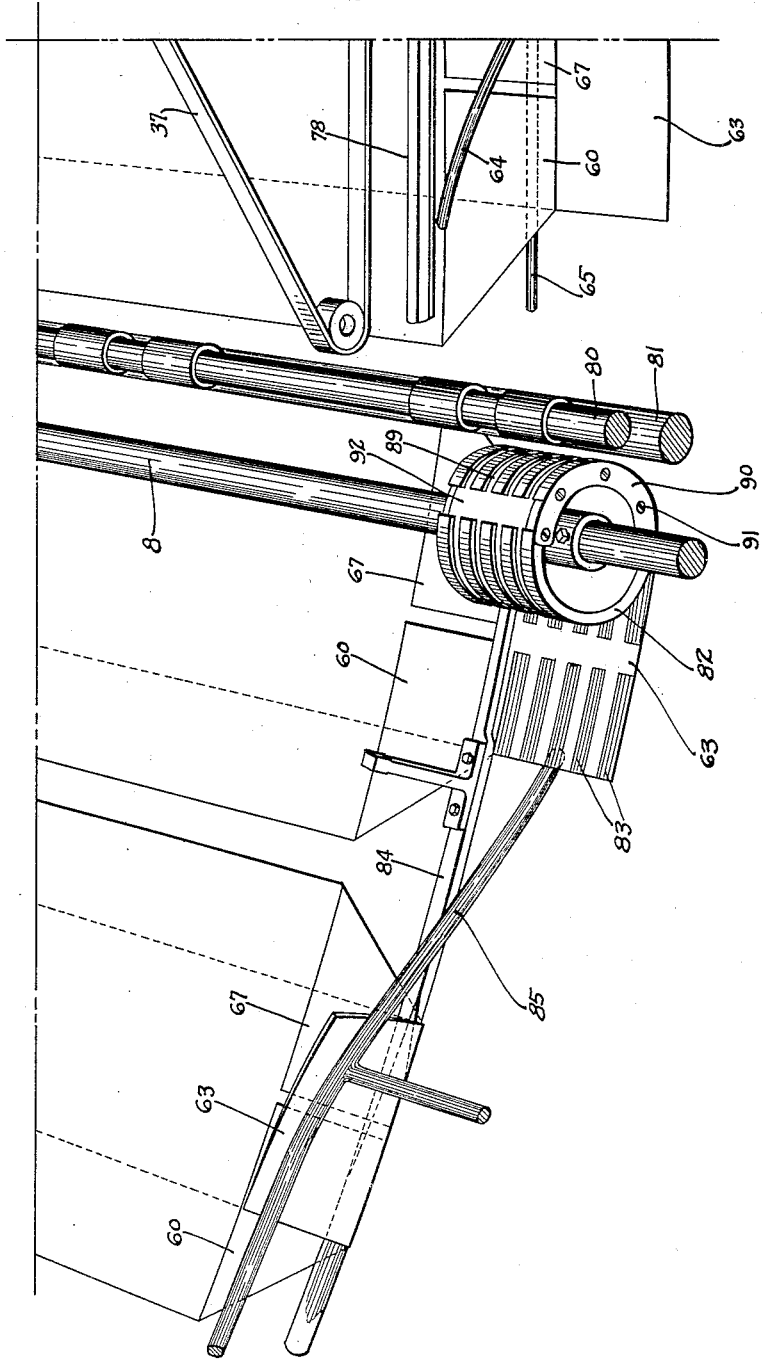
Figure 9 is a perspective detail showing the completion of the primary folding operation, the application of adhesive and the partial completion of the secondary folding operation on the left-hand side of the machine.
Figure 11:
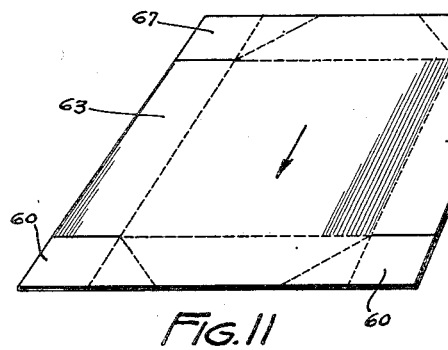
Figure 11 shows an open blank before it is fed into the machine.
Figure 12:
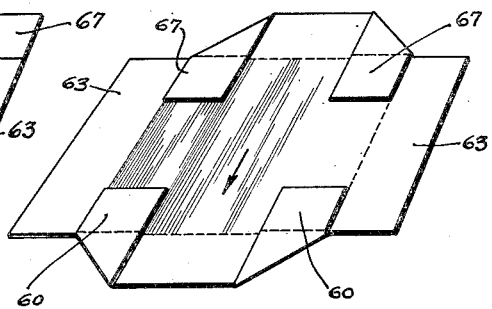
Figure 12 shows the same blank with the forward and rear flaps folded over, as shown in Figure 8.
Figure 13:
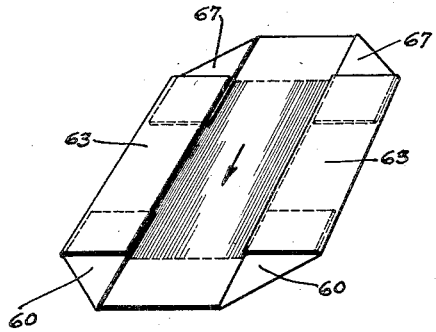
Figure 13 shows the center flap folded over the forward and rear flaps, similar to the position of the last blank in Figure 9.
Figure 14:
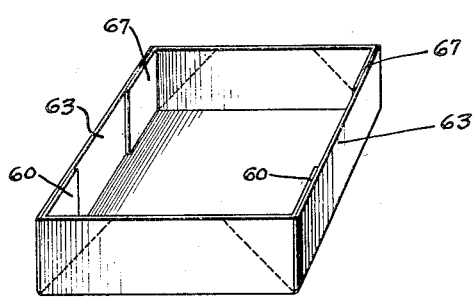
Figure 14 shows the completed collapsible box set up ready to receive articles of merchandise or other goods.

Referring to Figures 1, 7, 8 and 9, 78 represents former bars which are adjusted to the edge of the diagonal crease and adapted to hold the blank down to prevent it from raising with the end flaps 60 and 67. These former bars 78 are held in place by uprights 79 adjustably secured to the cross shaft 43. Referring to Figure 9, it will be seen that as the blank passes through the machine, the flaps 60 and 67 are folded over on the diagonal fold and towards each other, and are resting on the supporting bar 65, and are held down by the end of the stationary folder bar 64. The location of the former bar 78 is also shown, as well as the top carrier belt 37. In this position the blank is passed between a pair of feed rollers 80 and 81 which serve to roll down the folded flaps 60 and 67 and advance the blank under the adjustable glue wheel 82, mounted on the shaft 8. This adjustable glue wheel applies the adhesive on the flap 63, as shown in shaded lines at 83 in Figure 9.

After the adhesive has been applied, the blank advances in the machine through the action of the carrier mechanism 3 and 4, operating over the pulleys 5 and 7, which are mounted on the shafts 6 and 8. The former bar 84 is again provided to hold the blank down, and a stationary incline plow share folder bar 85 is provided to carry the center flap 63 over and down on the flaps 60 and 67, completing the folding operation.

The method of supplying adhesive to the adjustable glue wheel 82 is through a glue pot mechanism 86, consisting of a glue wheel 87 and a transfer wheel 88, which transfers the adhesive from the glue wheel 87 to the adjustable glue wheel 82. The adjustable glue wheel 82 has a loose plate 89 clamped in place by the clamps 90 through means of screws 91, so that the space 92 may be increased or decreased, depending upon the length of the adhesive required on the flap 63.

In the drawings, I have shown the pins 61 and 66 as being adjustable in V-shaped slots 22 on the drum 21.

Having thus described a construction by the use of which my invention may be practiced, the operation briefly is as follows:

The blanks being placed in the feed hopper 48 are fed into the machine one blank per revolution through the action of the rubber inserts 93 in the periphery of the feed wheels 46. The location of these rubber inserts is timed so that the blank will advance between the feed wheels 46 and the drum 21 to permit the projection 61 to raise the flap 60 over the top of the spreader bar 62, and with the location of the pin 66 (see Figure 2) at the proper point to raise the flap 67 over the top of the separator bar 62. As the blanks advance through the machine, the flap 60 will ride up on the incline of the stationary plow share folder 64, and the revolving folder 68 will pick up the flap 67 (see Figure 7) and fold it over into the position shown in Figure 8, so as to pass under the member 71.

The blank then passes under the glue wheel 62, receives the adhesive, and the center flap 63 is then folded over by the plow share stationary folder 85, thus completing the folding operation.

The balance of the mechanism has to do with the counting and stacking apparatus, similar to that described in the earlier patent before mentioned, and since no claim is made for it in this application, the construction is not illustrated.

Figure 10:
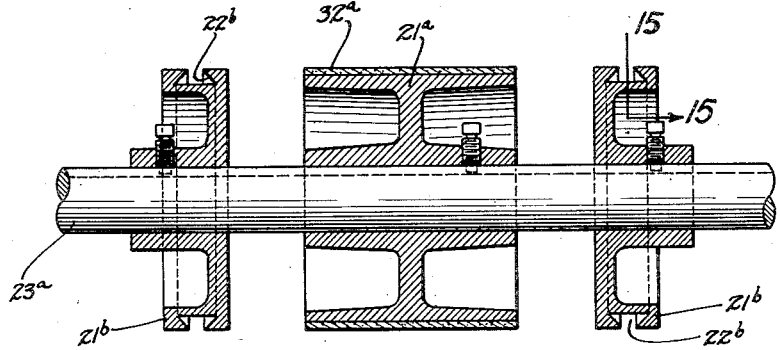
Figure 10 is a detail of an adjustable modified form of the adjustable pins for raising the front and rear flaps on the side and guiding same above the separator bar while the center flap passes underneath the same bar.
Figure 15:
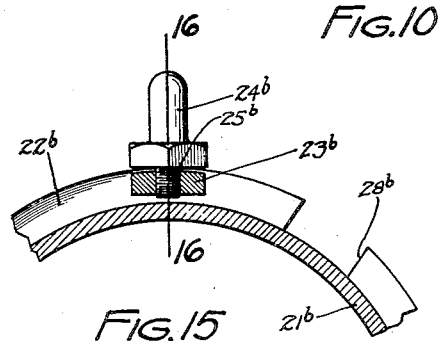
Figure 15 is a fragmentary detail sectional view on line 15—15 of Figure 10.
Figure 16:
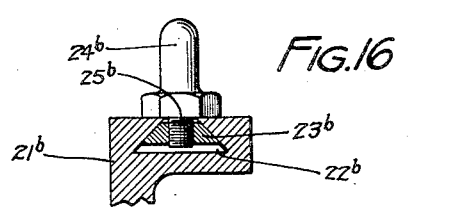
Figure 16 is a detail sectional view on line 16—16 of Figure 15.

In the modification of the selective flap lifting means shown in Figure 10, the drum 21 extending entirely across the machine and having the longitudinal grooves 22 is dispensed with. The shaft 23$^a$ extends entirely across the machine, and upon this shaft is mounted a pulley wheel 21$^a$ which carries the lower belt 32$^a$ cooperating with the belt 37 carried by the wheel 38 on the feeder shaft. Laterally of this pulley 21$^a$ are arranged two elements each substantially identical, and indicated at 21$^b$. This element has a circumferential V-shaped groove indicated at 22$^b$ in which is slidable a correspondingly shaped nut 23ᵇ, see Figure 16. A pin indicated at 24ᵇ has a screw-threaded shank 25ᵇ and a wrench face. The element 25ᵇ has screw-threaded connection with the nut 23ᵇ which nut is adjustable in the groove 22ᵇ. The nut is introduced at the cut-out portion 28ᵇ and after being moved to the proper position the element 24ᵇ is turned by means of a wrench to clamp the parts together as shown in Figures 15 and 16. This construction as well as the construction first described provide means for adjusting the pins or projections or their equivalents to perform the function of selectively engaging and raising respectively the front and rear flaps.

The means for selectively raising the flaps in the manner before described, along with means for receiving the flaps and means for turning the end flap are very important features of the invention. Another feature is the arrangement whereby the rotative wipers are adjustable crosswise of the frame without disconnection of their driving means, the adjustment being for the purpose of adapting them to operate on blanks of different lengths or widths transversely of the machine. Another feature is the adjustability of the flap-raising means to adopt it to cartons in which the distance between the front and rear flaps is greater or less, and also to adjust these elements peripherally to cause them to act at the proper time during the forward motion of the blank so that each will be received by the separator bar. Another feature of the invention includes the synchronization of the rotatable rear flap-folding device so as to time this device for folding the flap after its reception by the separator bar, and to move it at a speed (at least during the time when it is acting) greater than that of the speed of forward movement of the blank.

I claim as my invention:

1. A device of the class described comprising a feed mechanism, means for selectively moving the flaps of a carton blank laterally out of alignment with the face of the blank while being fed, means for receiving and folding one of the flaps so moved, additional means engageable to fold a rearmost flap after being so moved, and during feeding movement, and means for synchronizing the movements of the feed mechanism and rear flap folding means.

2. A device of the class described comprising a feed mechanism, means for selectively moving the flaps of a carton blank laterally out of alignment with the face of the blank while being fed, means for receiving and folding one of the flaps so moved, revolvable means engageable to fold a rearmost flap after being so moved, and during feeding movement, and means for synchronizing the movements of the feed mechanism and rear flap folding means.

3. A device of the class described comprising a feed mechanism, means for selectively lifting the front and rear flaps of a three flap carton blank while being fed, means for receiving and folding the front flap after lifting, revolvable means engageable with the rear flap after lifting to fold the same, and means for synchronizing the movements of the feed mechanism and rear flap folding means.

4. A device of the class described comprising a feed mechanism, means for selectively raising the front and rear flaps of a three flap carton while being fed, means arranged to receive the flaps after raising, a revolvable element arranged to engage the rear flap after raising and to fold said flap by a movement in the same direction with but at a greater speed than said flap, and means for synchronizing the movement of said feed mechanism and revolving element.

5. A device of the class described comprising a feed mechanism, means for selectively raising the front and rear flaps of a three flap carton while being fed, means arranged to receive the flaps after raising and to overfold the forward flap, a revolvable element arranged to engage the rear flap after raising, and to fold it, and means for synchronizing the movement of said feed mechanism and revolving element.

6. A device of the class described comprising a feed mechanism, means for selectively raising only the front and rear flaps of a three flap carton while being fed, means arranged to receive the flaps after raising and to overfold the forward flap, a revolvable element arranged to engage the rear flap after raising and to travel in the same direction with but at a greater speed than said flap and to fold it, and means for synchronizing the movement of said feed mechanism and revolving element.

7. A device of the class described comprising a feed mechanism, means synchronized with said feed mechanism for selectively lifting the flaps of a carton blank while being fed, said means including projections capable of relative adjustment in direction of feed, means for receiving said flaps after lifting, revolvable means engageable to fold a rearmost flap after lifting, said means having a curved carton-engaging portion arranged to pass over the flap-receiving means and beneath the rearmost flap, said curved portion being arranged to hold the flap down after folding, and means for synchronizing the movements of the feed mechanism and rear flap folding means.

8. A device of the class described comprising a feed mechanism, means for selectively simultaneuosly lifting the flaps at opposite sides of a carton blank while being fed, plural means for receiving and folding one flap at each side after lifting, revolvable means engageable to fold a rearmost flap at each side after lifting, means for synchronizing the movements of the feed mechanism and rear flap folding means, and means for adjusting a portion of said synchronizing mechanism and rear flap folding means conformably to different sizes of cartons.

9. A device of the class described comprising a feed mechanism, means for selectively lifting the flaps of a carton blank while being fed, means for receiving and folding one flap, after lifting, revolvable means engageable to fold a rearmost flap after lifting, means for synchronizing the movements of the feed mechanism and rear flap folding means, and means for adjusting a portion of said synchronizing mechanism and rear flap folding means conformably to different sizes of cartons.

10. A device of the class described comprising rotating feeding elements one of which has projections arranged to selectively consecutively raise the first and last flap of a three flap carton above the level of the middle flap, a separator bar arranged to receive the flaps after lifting, a stationary folder bar adapted to receive the flaps from the separator bar, the separator bar and stationary folder bar being so arranged that the center flap passes beneath separator and folder and a rotatible element synchronized to fold the flap over in direction of movement, the speed of that portion of the rotatable folder which engages the blank being greater than the speed of travel of the blank.

11. A device of the class described including a feed mechanism, means for selectively lifting the front and rear flaps of a three flap carton blank, a separator bar arranged to receive the flaps after lifting and to hold them in lifted position while the blank is fed, a folder bar arranged to receive the blanks from the separator bar, and adapted to fold the front flap over upon the face of the blank, said folder bar being arranged so that the middle flap passes therebeneath, a rear flap folding element arranged and synchronized to operate over said separator bar and under the rear flap and to engage the rear flap after reception by the separator bar, and having a portion adapted to swing the flap over and upon the top surface of the carbon, and a guide arranged to hold the rear flap in its downwardly folded position until received by the stationary folder bar.

12. A device of the class described including a feed mechanism, means for selectively lifting the front and rear flaps of a three flap carton blank, a separator bar arranged to receive the flaps after lifting and to hold them in lifted position while the blank is fed, a folder bar arranged to receive the blanks from the separator bar, and adapted to fold the front flap over upon the face of the blank, said folder bar being arranged so that the middle flap passes therebeneath, a rear flap folding element arranged to operate over said separator bar and under the rear flap and to engage the rear flap after reception by the separator bar and having a portion adapted to turn the flap upwardly and then downwardly upon the top portion of the carton and hold it in this position, a guide rod arranged to hold the rear flap in its downwardly folded position until it is received by the stationary folder bar, feed rolls for flattening the folded flaps and advancing the blank, a glue wheel arranged to apply adhesive to the center flap after passage through the flattening and feed rolls, a stationary inclined folder bar for folding the glued flap over and downwardly upon the folded front and rear flaps to complete the folding operation, mechanism for synchronizing the feed mechanism with the rear flap folder, and for synchronizing movement of the gluing wheel with the feed mechanism.

13. A device of the class described including a feed mechanism, means for selectively lifting the front and rear flaps of a three flap carton blank, a separator bar arranged to receive the flaps after lifting, a stationary folder bar arranged to receive the blanks from the separator bar, a rear flap folding element arranged to engage the rear flap and having a portion adapted to turn the flap downwardly upon the top portion of the carton, a guide rod arranged to hold the rear flap in its downwardly folded position until it is received by the stationary folder bar, feed rolls for flattening the folded flaps and advancing the blank, a glue wheel arranged to apply adhesive to the center flap after passage of the blank through the flattening and feed rolls, a stationary inclined folder bar for folding the glued flap over and downwardly upon the folded front and rear flaps to complete the folding operation, mechanism for synchronizing the feed mechanism with the rear flap folder, and for synchronizing movement of the gluing wheel with the feed mechanism.

14. A device of the class described including a feed mechanism, means for selectively lifting the front and rear flaps of a three flap carton blank, a separator bar arranged to receive the flaps after lifting and to hold them in lifted position while the blank is fed, a stationary folder bar arranged to receive the blanks from the separator bar, a supporting bar to prevent sagging of the blank, said folder bar being arranged so that the middle flap passes therebeneath, a rear flap folding element arranged to operat over said separator bar and under the rear flap and to engage the rear flap after reception by the separator bar and having a portion adapted to turn the flap upwardly and then downwardly upon the top portion of the carton and hold it in this position, a guide rod arranged to hold the rear flap in its downwardly folded position until it is received by the stationary folder bar, a former bar adapted to prevent rising of the end flaps after folding, feed rolls for flattening the folded flaps and advancing the blank, a glue wheel arranged to apply adhesive to the center flap after passage through the flattening and feed rolls, a stationary inclined folder bar for folding the glued flap over and downwardly upon the folded front and rear flaps to complete the folding operation, mechanism for synchronizing the feed mechanism with the rear flap folder, and for synchronizing movement of the gluing wheel with the feed mechanism.

15. A device of the class described, comprising a feed mechanism, means for selectively moving the flaps of a carton blank to and holding the flaps in different planes while being fed, and means adapted to engage with the rear flap while being held and fold the same, and means for synchronizing the movements of the feed mechanism and rear flap folding means.

16. A device of the class described comprising a feed mechanism, means for selectively lifting the flaps of a carton blank while being fed and holding the flaps in different planes during feeding, and means adapted to engage with the rear flap after lifting and while being held in lifted position to fold the same, and means for synchronizing the movements of the feed mechanism and rear flap folding means.

17. A device of the class described comprising a feed mechanism, means for selectively lifting the front and rear flaps of a three-flap carton blank while being fed and holding the flaps in different planes during feeding, means for receiving and folding the front and rear flap after lifting, and revolvable means movable in a substantially horizontal plane and adapted to engage with the rear flap after lifting to fold the same, and means for synchronizing the movements of the feed mechanism and rear flap folding means.

18. A box making machine including means for moving box blanks without pause for forming the boxes, means arranged along the plane of movement of the boxes acting to fold front portions of the box blanks inversely to the direction of movement of the blanks, means rotatable in a horizontal plane over the box blanks acting to fold rear portions thereof, similar to said front portions, in the direction of movement of the blanks, devices acting to apply glue to unfolded portions of the box blanks, and means acting to fold the last named portions over said front and rear folded portions for effecting adhesion therebetween.

19. A box making machine including means for moving box blanks without pause for forming the boxes, means arranged along the plane of movement of the boxes acting to fold front portions of the box blanks inversely to the direction of movement of the blanks, means rotatable over the box blanks and operably timed with the box moving means, acting to fold rear portions of the blanks, similar to said front portions, in the direction of movement of the blanks, devices acting to apply glue to unfolded portions of the box blanks, and means acting to fold the last named portions over said front and rear folded portions for effecting adhesion therebetween.

20. A machine of the character described including a carrier for moving box blanks on said machine, fixed members along the opposite sides of said carrier acting to deflect opposite outer front and rear sealing portions of said blanks upward, other fixed members along the opposite sides of the carrier, rearward of said first fixed members, acting to fold said front sealing portions over the face of said blanks inverse to the direction of movement thereof, means rotatable in the plane of movement of the blanks acting to fold said rear sealing portions over the face of the blanks in the direction of movement thereof, devices acting to apply glue to sealing flaps intermediate said outer sealing flaps, and means acting to fold said intermediate flaps over said outer flaps for effecting adhesion therebetween.

21. A machine of the character described including a carrier for moving box blanks on said machine, feed rollers for moving the box blanks singly to said carrier, means supported on one of the feed rollers for deflecting opposite outer front and rear sealing portions of said blanks upward, fixed members along the opposite sides of said carrier acting to further move said deflected portions upward, other fixed members along the opposite sides of the carrier rearward of said first fixed members, acting to fold said front sealing portions over the face of said blanks, means rotatable in the plane of movement of the blanks acting to fold said rear sealing portions over the face of the blanks in the direction of movement of the blanks, devices acting to apply glue to sealing flaps intermediate said outer sealing flaps, and means acting to fold said intermediate flaps over said outer flaps for effecting adhesion therebetween.

In witness whereof, I have hereunto set my hand this 5th day of March 1929.

EDWIN G. STAUDE.